United States Patent
Ito et al.

(10) Patent No.: US 9,287,019 B2
(45) Date of Patent: Mar. 15, 2016

(54) COMPOSITION FOR WIRE PROTECTIVE MEMBER, WIRE PROTECTIVE MEMBER, AND WIRING HARNESS

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Kenji Ito, Yokkaichi (JP); Masashi Sato, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/391,974

(22) PCT Filed: Mar. 28, 2013

(86) PCT No.: PCT/JP2013/059246
§ 371 (c)(1),
(2) Date: Oct. 10, 2014

(87) PCT Pub. No.: WO2013/161502
PCT Pub. Date: Oct. 31, 2013

(65) Prior Publication Data
US 2015/0075861 A1 Mar. 19, 2015

(30) Foreign Application Priority Data
Apr. 27, 2012 (JP) ................. 2012-103084

(51) Int. Cl.
| | | |
|---|---|---|
| *H01B 3/44* | (2006.01) | |
| *B60R 16/02* | (2006.01) | |
| *H02G 3/04* | (2006.01) | |
| *H01B 7/295* | (2006.01) | |
| *H01B 7/28* | (2006.01) | |
| *C08K 5/13* | (2006.01) | |
| *C08K 5/3445* | (2006.01) | |
| *C08L 23/14* | (2006.01) | |
| *C08K 5/49* | (2006.01) | |
| *C08K 3/22* | (2006.01) | |

(52) U.S. Cl.
CPC ............ *H01B 3/441* (2013.01); *B60R 16/0215* (2013.01); *C08K 3/22* (2013.01); *C08K 5/13* (2013.01); *C08K 5/3445* (2013.01); *C08K 5/49* (2013.01); *C08L 23/14* (2013.01); *H01B 7/2813* (2013.01); *H01B 7/295* (2013.01); *H02G 3/0406* (2013.01); *H02G 3/0412* (2013.01)

(58) Field of Classification Search
CPC ...... H01B 3/441; H01B 7/295; H01B 7/2813; C08K 5/3445; C08K 5/13; C08K 5/49; C08L 23/14; C08F 210/06; C08F 2500/12; H02G 3/0412; H02G 3/0406; B60R 16/0215
USPC ................................ 174/110 R, 121 A, 72 A
See application file for complete search history.

(56) References Cited

U.S. PATENT DOCUMENTS

| | | |
|---|---|---|
| 6,852,921 B1 | 2/2005 | Koike et al. |
| 2004/0168820 A1* | 9/2004 | Kanamori et al. ........ 174/110 R |
| 2013/0008691 A1* | 1/2013 | Shimada et al. ............. 174/120 |
| 2013/0273367 A1* | 10/2013 | Shimada et al. ............. 428/389 |

FOREIGN PATENT DOCUMENTS

| | | |
|---|---|---|
| CN | 1511179 A | 7/2004 |
| EP | 0 627 463 A2 | 12/1994 |
| JP | A-5-78530 | 3/1993 |
| JP | A-6-345979 | 12/1994 |
| JP | A-7-186293 | 7/1995 |
| JP | H10-185015 A | 7/1998 |
| JP | A-2002-128963 | 5/2002 |
| JP | 2002-356591 A | 12/2002 |
| JP | A-2011-202069 | 10/2011 |
| JP | 2011-219530 A | 11/2011 |
| JP | 2013-227373 A | 11/2013 |

(Continued)

OTHER PUBLICATIONS

International Search Report issued in International Patent Application No. PCT/JP2013/059246 dated Jun. 25, 2013.
Sep. 29, 2015 Office Action issued in Japanese Patent Application No. 2012-103084.

(Continued)

*Primary Examiner* — Hoa C Nguyen
*Assistant Examiner* — Amol Patel
(74) *Attorney, Agent, or Firm* — Oliff PLC

(57) ABSTRACT

A composition for a wire protective member with heat resistance, flame retardancy, and resistance against both a calcium chloride and a braided wire; a wire protective member and a wire harness using the composition. The composition for a wire protective member is produced by including a polypropylene having a propylene monomer constituting 50 to 95 percent by mass of monomers forming a polymer, a melt flow rate of 0.5 to 5 g/10 min, and a melting point of 150 degrees C. or more; a bromine-based flame retardant and an antimony trioxide as a flame retarder; a phenol-based antioxidant as a heat resistance life improving agent; and a metal deactivator, wherein the propylene has a tensile strength of 20 to 35 MPa and a Charpy impact strength of 10 kJ/m$^2$ or more at 23 degrees C.

20 Claims, No Drawings

(56) References Cited

FOREIGN PATENT DOCUMENTS

| WO | WO 2011/125924 | A1 | 10/2011 |
| WO | WO 2012/105329 | A1 | 8/2012 |

OTHER PUBLICATIONS

Nov. 27, 2015 Office Action issued in Chinese Patent Application No. 201380022336.1.

* cited by examiner

COMPOSITION FOR WIRE PROTECTIVE MEMBER, WIRE PROTECTIVE MEMBER, AND WIRING HARNESS

TECHNICAL FIELD

The present invention relates to a wire protective member for protecting a wire bundle like a corrugate tube which is used for vehicle components for cars and components for electric/electronic equipment, a composition for the wire protective member, and a wiring harness using the wire protective member.

BACKGROUND ART

As described in Patent Literature 1, the flame retardant corrugate tube made of a flame retardant composition which is produced by combining a specific bromine-based flame retardant with a polyolefin has conventionally been known as a protective member of electric wires in an automobile. Although this flame retardant corrugate tube has fire retardancy, in general, its tolerable maximum temperature for continuous use is around 80 to 90 degrees C. because a polyolefin is used. Higher heat resistance is required for the wire protective member.

In recent years, demand for EV (Electric Vehicle) and HEV (Hybrid Electric Vehicle) and like has been increasing. For these kinds of vehicles, high voltage wires can be routed under the floor. The high voltage wire transmits large current and generates high heat, so it requires heat resistance. In case the heat resistance is required, a corrugate tube using a polyamide 6 (PA6) instead of a polyolefin is usually used. (see Patent Literature 2)

CITATION LIST

Patent Literature

PTL1: JP Heil-186293 A
PTL2: JP 2011-202069 A

SUMMARY OF INVENTION

Technical Problem

However, there is a problem that the corrugate tube using the polyamide 6 has low resistance against a snow melting agent like a calcium chloride at under the floor. In contrast, although the corrugate tube using the polyolefin has lower heat resistance than the one using polyamide 6, it has high resistance against a calcium chloride.

In addition, a wire harness consisting of high voltage wires requires shielding ability. To improve the shielding ability of the wire harness, a braided wire made of copper can be placed between an insulated wire and a corrugate tube. However, there is a problem that the heat aging resistance of the corrugate tube using the polyolefin which has resistance against a calcium chloride deteriorates seriously when its polyolefin contacts with the braided wire directly.

The objects of the present invention is to provide a composition for a wire protective member which has heat resistance, flame retardancy, resistance against a calcium chloride, and resistance against a braided wire, a wire, protective member, and a wire harness.

Solution to Problem

In order to achieve the objects, a composition for a wire protective member of the present invention comprising a polypropylene having a propylene monomer constituting 50 to 95 percent by mass of monomers forming a polymer, a melt flow rate of 0.5 to 5 g/10 min, and a melting point of 150 degrees C. or more; a bromine-based flame retardant and an antimony trioxide as a flame retarder; a phenol-based antioxidant as a heat resistance life improving agent; and a metal deactivator, wherein the propylene has a tensile strength of 20 to 35 MPa and a Charpy impact strength of 10 kJ/m2 or more at 23 degrees C.; and 1.5 to 15 parts by mass in total of the bromine-based flame retardant and the antimony trioxide, 0.1 to 3 parts by mass of the phenol-based antioxidant, and 0.1 to 3 parts by mass of the metal deactivator are compounded with 100 parts by mass of the polypropylene.

It is preferable for the composition for a wire protective member that 0.1 to 3 parts by mass of an imidazole-based antioxidant is further compounded with 100 parts by mass of the polypropylene.

It is preferable for the composition for a wire protective member that 0.1 to 3 parts by mass of a phosphorus-based antioxidant is further compounded with 100 parts by mass of the polypropylene.

It is preferable for the composition for a wire protective member that 0.1 to 3 parts by mass of a metallic oxide is further compounded with 100 parts by mass of the polypropylene.

It is preferable for the composition for a wire protective member that the metallic oxide is at least one kind of metallic oxide selected from the group consisting of a zinc oxide, an aluminum oxide, a magnesium oxide, and a tin oxide.

A wire protective member of the present invention is made of the composition for a wire protective member and formed in a shape being able to protect a wire.

A wire harness of the present invention is a bundle of insulated wires coated with a wire protective member made of the composition for a wire protective member.

Advantageous Effects of Invention

The composition for a wire protective member of the present invention comprises a polypropylene having a propylene monomer constituting 50 to 95 percent by mass of monomers forming a polymer, a melt flow rate of 0.5 to 5 g/10 min, and a melting point of 150 degrees C. or more; a bromine-based flame retardant and an antimony trioxide as a flame retarder; a phenol-based antioxidant as a heat resistance life improving agent; and a metal deactivator, wherein the propylene has a tensile strength of 20 to 35 MPa and a Charpy impact strength of 10 kJ/m$^2$ or more at 23 degrees C.; and 1.5 to 15 parts by mass in total of the bromine-based flame retardant and the antimony trioxide, 0.1 to 3 parts by mass of the phenol-based antioxidant, and 0.1 to 3 parts by mass of the metal deactivator are compounded with 100 parts by mass of the polypropylene. Therefore, by using the composition of the present invention, a wire protective member which has heat resistance, flame retardancy, resistance against a calcium chloride, and resistance against a braided wire can be obtained. The composition for a wire protective member of the present invention is suitable for a protective member of high voltage wires routed in a car.

The wire protective member of the present invention is made of the composition for a wire protective member and formed in a shape being able to protect wires. Therefore, when the wire protective member is used as a corrugate tube of high voltage wires in a car, the corrugate tube fulfills the properties of the heat resistance, flame retardancy, resistance against a calcium chloride, and resistance against a braided wire enough.

The wire harness of the present invention is a bundle of insulated wires coated with a wire protective member made of the composition for a wire protective member. Therefore, the wire harness for high voltage wires which fulfills the properties of the heat resistance, flame retardancy, resistance against a calcium chloride, and resistance against a braided wire can be obtained.

DESCRIPTION OF EMBODIMENTS

A detailed description of preferred embodiments of the present invention will now be provided. The composition for a wire protective member of the present embodiment can be made of the following constituents.

[base resin]
(A) polypropylene
[flame retarder]
(B) bromine-based flame retardant
(C) antimony trioxide
[heat resistance life improving agent]
(D) phenol-based antioxidant
(E) imidazole-based antioxidant
(F) metal deactivator
(G) phosphorus-based antioxidant
(H) metallic oxide The explanations of constituents (A) to (H) will now be provided. (A) polypropylene is used as a base resin. The polypropylene is a copolymer in which 50 to 95 percent by mass of monomers forming polymers are a propylene monomer, and is copolymerized with monomers other than the propylene monomer. The monomers other than the propylene monomer include an ethylene, a 3-20 C α-olefin, a non-conjugated polyene, and the like.

The 3-20 C α-olefin includes propylene, 1-butene, 4-methyl-1-pentene, 1-hexene, 1-heptene, 1-octene, 1-nonene, 1-decease, 1-undecene, 1-dodecen, 1-tridecene, 1-tetradecene, 1-pentadecene, 1-hexadecene, 1-heptadecene, 1-nonadecen, 1-eicosen, 9-methyl-1-decene, 11-methyl-1-dodecen, 12-ethyl-1-tetradecene, and the like. The non-conjugated polyene includes dicyclopentadiene, ethylidene norbornane, and the like.

The polypropylene may be a block polypropylene or a random polypropylene. The molecular structure of the polypropylene may be syndiotactic polypropylene, isotactic polypropylene, or, atactic polypropylene.

The polypropylene has a MFR (melt flow rate) of 0.5 to 5 g/10 min at 230 degrees C. The MFR value of the present invention was measured by a testing method conforming to JIS K 7210 at 230 degrees C. The preferable MFR of the polypropylene is within the range of 1.0 to 4.0 g/10 min. When the MFR of the polypropylene is less than 0.5 g/10 min, the molding is difficult because a parison will be hard to expand by blow molding and a larger load will be imposed on the molding machine. When the MFR of the polypropylene is more than 5 g/10 min, the molding is also difficult because a parison will easily breaks. When the MFR is within the range above, a molded product with excellent formability and heat aging resistance can be obtained.

The melting point of the polypropylene is 150 degrees C or more, more preferably, 160 degrees C. or more. When the melting point is less than 150 degrees C., the resistance to heat distortion is insufficient. The melting point is a value measured by a testing method conforming to JIS K 7121.

The polypropylene to be used has a tensile strength of 20 to 35 MPa. The tensile strength is the value measured by a testing method conforming to JIS K 7161. When the tensile strength is less than the range, the abrasion resistance will be insufficient. When the tensile strength is more than the range, the impact strength will be insufficient.

The polypropylene to be used has a Charpy impact strength of 10 $kJ/m^2$ or more at 23 degrees C. The Charpy impact strength is the value measured by a testing method conforming to JIS K 7111. When the Charpy impact strength is less than 10 $kJ/m^2$, the protection ability will be insufficient.

(B) bromine-based flame retardant and (C) antimony trioxide are used in combination as the flame retarder. Examples of (B) bromine-based flame retardant are ethylenebi's (pentabromobenzene) [also known as bis (pentabromophenyl)ethane], ethylene bis dibromo norbornanedicarboxylic dicarboximide, ethylenebistetrabromophthalimide, tetrabromobisphenol A (TBBA), hexabromocyclododecane (HBCD), tetrabromobisphenol S (TBBPS), bis (tetrabromophthalimide) ethane, TBBA-carbonate oligomer, TBBA-epoxy oligomer, brominated polystyrene, TBBA-bis(dibromopropylether), poly (dibromopropylether), hexabromobenzene (HBB), and the like.

(C) antimony trioxide includes, for example, a mineral antimony trioxide atomized by pulverization treatment. By using the antimony trioxide and a bromine-based flame retardant in combination, the amount of the bromine-based flame retardant can be reduced.

The compounding amount of the flame retarder is within the range of 1.5 to 15 parts by mass in total with respect to 100 parts by mass of the polypropylene. The bromine-based flame retardant and the antimony trioxide are used as the flame retarder in combination. When the compounding amount of the flame retarder is less than 1.5 parts by mass, the flame retardance would be insufficient, and when it is more than 15 parts by mass, the heat aging resistance would be deteriorated. The preferable compounding ratio of the bromine-based flame retardant and the antimony trioxide in mass ratio is within the range of bromine-based flame retardant:antimony trioxide=1:1 to 4:1 from the viewpoint of addition efficiency.

As the heat resistance life improving agent, at least (D) phenol-based antioxidant, (E) imidazole-based antioxidant, and (F) metal deactivator are used. The compounding ratio of each heat resistance life improving agent (D), (E), and (F) with respect to 100 parts by mass of the polypropylene is within the range of 0.1 to 3 parts by mass.

For (D) phenol-based antioxidant, a hindered phenol antioxidant can be used. The hindered phenol antioxidant includes pentaerythritol tetrakis[3-(3,5-di-tert-butyl-4-hydroxyphenyl)propionate], thiodiethylene bis[3-(3,5-di-tert-butyl-4-hydroxyphenyl)propionate], octadecyl-3-(3,5-di-tert-butyl-4-hydroxyphenyl)propionate, N,N'-hexane-1,6-diyl bis[3-(3,5-di-tert-butyl-4-hydroxyphenylpropionamide), benzene propanoic acid, 3,5-bis(1,1-dimethylethyl)-4-hydroxy, C7-C9 side chain alkyl ester, 2,4-dimethyl-6-(1-methylpentadecyl)phenol, diethyl [[3,5-bis(1,1-dimethylethyl)-4-hydroxyphenyl]methyl] phosphonate, 3,3',3'',5,5'5''-hexa-tert-butyl-a,a',a''-(mesitylene-2,4,6-triyl)tri-p-cresol, calcium diethyl bis[[[3,5-bis(1,1-dimethylethyl)-4-hydroxyphenyl]methyl]phosphonate], 4,6-bis(octylthiomethyl)-o-cresol, ethylenebis(oxyethylene) bis[3-(5-tert-butyl-4-hydroxy-m-tolyl)propionate], hexamethylene bis[3-(3,5-di-tert-butyl-4-hydroxyphenyl)propionate, 1,3,5-tris(3,5-di-tert-butyl-4-hydroxybenzyl)-1,3,5-triazine-2,4,6(1H,3H,5H)-trione, 1,3,5-tris[(4-tert-butyl-3-hydroxy-2,6-xylyl)methyl]-1,3,5-triazine-2,4,6(1H,3H,5H)-trione, 2,6-tert-butyl-4-(4,6-bis(octylthio)-1,3,5-triazin-2-ylamino)phenol, 2,6-di-tert-butyl-4-methylphenol, 2,2'-methylenebis(4-methyl-6-tert-butylphenol), 4,4'-butylidenebis(3-methyl-6-tert-butylphenol), 4,4'-thiobis(3- methyl-6-tert-butylphenol), 3,9-bis[2-(3-(3-tert-butyl-4-hydroxy-5-methylphenyl)-Puropinoki)-1,1-dimethylethyl]-2,4,8,10-tetraoxaspiro(5,5)undecane. They can be used alone, and two kinds or more of them can also be used in combination.

Besides the hindered phenol antioxidant, a monophenol antioxidant, a diphenol antioxidant, a triphenol antioxidant, a polyphenol antioxidant, and the like can also be used for (D) phenol-based antioxidant.

(E) imidazole-based antioxidant includes 2-mercaptobenzimidazole, 2-mercaptomethylbenzimidazole, 4-mercaptomethylbenzimidazole, 5-mercaptomethylbenzimidazole, and the like, and a zinc salt of them.

A compound which produces an inert substance like a chelate compound by reacting with a metal ion, a compound being able to protect a metal surface when contacted with the metal surface, or the like can be used as (F) metal deactivator. The metal deactivator includes an aminotriazole-based compound such as 3-(N-salicyloyl)amino-1,2,4-triazole and its acylated derivative, a benzotriazole-based compound such as 1,2,3-benzotriazole, and a decamethylene carboxylic acid disalicyloyl hydrazine. They can be used alone, and two kinds or more of them can also be used in combination.

0.1 to 3 parts by mass of (G) phosphorus-based antioxidant with respect to 100 parts by mass of the polypropylene can further be compounded in the heat resistance life improving agent. By compounding the phosphorus-based antioxidant, the processing stability will be improved. The phosphorus-based antioxidant includes diphenyl nonylphenyl phosphite, tris-tridecyl phosphite, tris(2,4-di-tert-butylphenyl)phosphite.

0.1 to 3 parts by mass of (H) metallic oxide with respect to 100 parts by mass of the polypropylene can further be compounded in the heat resistance life improving agent. As (H) metallic oxide, it is preferable to use at least one kind of metallic oxide selected from the group consisting of a zinc oxide, an aluminum oxide, a magnesium oxide, a tin oxide, and the like. They can be used alone, and two kinds or more of them can also be used in combination.

Besides the above constituents, additives such as a stabilizing agent, a weatherproofing agent, a copper inhibitor, a coloring agent, an antistatic agent, a lubricant, a nucleating agent, a non-halogen flame retardant, and a filler can be added suitably to the composition for a wire protective member of the present invention as long as they do not spoil the advantageous effects of the present invention.

The composition for a wire protective member of the present invention can be prepared by mixing the above constituents by a publicly known mixing method. The compounding order, mixing method, and the like for mixing are not particularly limited. The specific mixing method includes a method with an ordinary kneading machine such as a tumbler-type blender, a V-type blender, a Henschel mixer, a ribbon mixer, an extruder (monoaxial, biaxial), a banbury mixer, a pressure kneader, a roll.

The wire protective member of the present invention is made of the composition for a wire protective member, and formed in a shape being able to protect a wire. The specific shape of the wire protective member is not particularly limited as long as being able to protect a wire or a bundle of wires. The shape of the wire protective member should be able to protect a bundle of wires in the wire protective member from external environment and so on by coating the bundle of wires. The specific shape of the wire protective member includes a corrugate tube. A manufacturing method of the corrugate tube comprises the steps of extruding a tube, and forming it in bellows shape with a metal mold.

The wire harness of the present invention is a bundle of insulated wires being coated with a wire protective member made of the composition for a wire protective member.

The bundle of wires used for the wire harness can be a bundle of only insulated wires, or a bundle of the mixture of insulated wires and other insulated wires. The number of the wires in the bundles is not particularly limited.

The wire harness can have a shielding layer between the outer periphery of the bundle of wires and the wire protective member. Publicly known shielding materials such as a braid made from metal wires like a copper wire, a metallic thin film, and the like can be used as the shielding layer. By the present invention, a wire harness whose wire protective member has "excellent" resistance against a braid made from copper or the like, and has excellent shielding ability can be obtained.

For example, non-halogen olefin resin in which a flame retardant such as a magnesium hydroxide is compounded with a polypropylene or the like is publicly known as an ordinary composition for a wire coating material, although it is not a composition for a wire protective member. The flame retardancy required for a protective member for high voltage wires of a car could not be obtained even compounding more than 100 parts by mass of flame retardant (magnesium hydroxide) with respect to 100 parts by mass of olefin resin. The high filling of filler like the magnesium hydroxide deteriorates the breaking elongation, so the heat aging resistance required for a wire protective member could not be obtained. In contrast, the present invention does not use a hydroxide such as the magnesium hydroxide but uses the bromine-based flame retardant and the antimony trioxide in combination. This feature reduces the total amount of flame retardant, and provides sufficient breaking elongation. Moreover, in the present invention, specified quantity of particular plural antioxidants is compounded as the heat resistance life improving agent. This feature enables to fulfill the properties such as flame retardance and breaking elongation. In addition, the deterioration when contacted with copper or the like will be prevented by the added metal deactivator. Therefore, even when placing a braided wire between the wire protective member and insulated wires, the progress of deterioration when the polypropylene contacted with the braided wire at high temperature will be prevented.

EXAMPLES

Hereinafter, the examples and comparative examples of the present invention will be described. The present invention should not be limited by those examples and comparative examples.

[Sample Materials, Manufacturer, and Others]

The sample materials used in the examples and comparative examples are shown below with their manufacturer, trade name, and so on. In regard to the polypropylene, MFR, melting point, tensile strength, Charpy impact strength, and others are shown in the tables.

(A: Polypropylene)

[1] Block PP 1: manufactured by Japan Polypropylene Corporation, trade name "EC9"

[2] Block PP 2: manufactured by Prime Polymer Co., Ltd., trade name "J356HP"

[3] Block PP 3: manufactured by Prime Polymer Co., Ltd., trade name "J704UG"

[4] Block PP 4: manufactured by Prime Polymer Co., Ltd., trade name "J705UG"

[5] Block PP 5: manufactured by Japan Polypropylene Corporation, trade name "EG8"

[6] homo PP: manufactured by Prime Polymer Co., Ltd., trade name "E203GP"
[7] PP elastomer: manufactured by Sumitomo Chemical Company, Limited, trade name "ESPOLEX817"
[8] PA6 (polyamide6): manufactured by Ube Industries, Ltd., trade name "1020S"

(B: Bromine-Based Flame Retardant)
manufactured by ALBEMARLE JAPAN CORPORATION, trade name "SAYTEX8010"

(C: Antimony Trioxide)
manufactured by SUZUHIRO CHEMICAL CO., LTD., trade name "AT-3CNLP"

(D: Phenol-Based Antioxidant)
manufactured by BASF Japan Ltd., trade name "IRGANOX1010"

(E: Imidazole-Based Antioxidant)
manufactured by Kawaguchi Chemical Industry Co., LTD., trade name "Antage MB"

(F: Metal Deactivator)
manufactured by ADEKA CORPORATION, trade name "CDA-1"

(G: Phosphorus-Based Antioxidant)
manufactured by BASF Japan Ltd., trade name "IRGAFOS168"

(H: Metallic Oxide)
manufactured by HakusuiTech Co., Ltd., trade name "zinc white class 2"

(I: Magnesium Oxide)
manufactured by Konoshima Chemical Co., Ltd., trade name "Magseeds N-4"

(J: Melamine Cyanurate)
manufactured by SAKAI CHEMICAL INDUSTRY CO., LTD., trade name "MC-2010N"

(K: Copper Iodide)
manufactured by Wako Pure Chemical Industries, Ltd., trade name "copper iodide first-class reagent"

(L: Potassium Iodide)
manufactured by Wako Pure Chemical Industries, Ltd., trade name "potassium iodide first-class reagent"

[Producing a Wire Protective Member]

The compositions were obtained by mixing the constituents shown in Examples 1 to 17 and Comparative Examples 1 to 17 in Table 1 to 4 with a biaxial kneader at kneading temperature of 220 degrees C., and forming them into a pellet shape with a pelletizer.

And then, a dumbbell-shaped test piece and a corrugate tube were produced with the composition and evaluations were performed on them. The test results are shown in Table 1 to 4. The dumbbell-shaped test piece was produced by punching into the shape of JIS dumbbell type #3 from a sheet of 140 mm×140 mm×1 mm obtained by heat-compressing the pellet at 220 degrees C. The corrugate tube was formed to have an inner diameter of 25 mm and a length of 50 m by extrusion blow molding at 220 degrees C. The concrete evaluation methods are as follows.

[Flame Retardancy Test]

The test pieces were prepared by cutting the corrugate tube having the inner diameter of 25 mm into a length of 200 mm conforming to JIS K-7201, and the maximum oxygen concentration in which a flame ignited on the test piece was to be extinguished within 180 seconds was measured. The maximum oxygen concentration of 22 or more was rated as "passing", the others were rated as failure.

[Tensile Strength, Breaking Elongation]

The tensile strength and breaking elongation were measured by a tension test at tensile speed of 50 mm/min using the JIS dumbbell type #3 test piece having a thickness of 1 mm.

The tensile strength of 25 MPa or more was rated as "passing", the others were rated as failure. The breaking elongation of 500% or more was rated as "passing", 600% or more was rated as "good", less than 500% was rated as failure.

[Heat Aging Resistance 1]

The heat resistance life until the breaking elongation became 50% was measured by a heat aging test at 150 degrees C. using the JIS dumbbell type #3 test piece having a thickness of 1 mm. The heat resistance life at 150 degrees C. of 1000 to less than 1300 hours was rated as "passing", 1300 to less than 1500 hours was rated as "good", 1500 hours or more was rated as "excellent", and less than 1000 hours was rated as failure.

[Bleed]

When the surface of the JIS dumbbell type #3 test piece having a thickness of 1 mm had become white at 150 degrees C.×500 hours during the heat aging test at 150 degrees C., the test piece was rated as failure, and the others were rated as "passing".

[Formability]

The ones being unmoldable by blow molding with a horizontal corrugator, the ones that dregs accumulated in a nozzle and a foreign matter stuck to the product, and the ones that bleeding of additives was occurred on the surface were rated as failure, and the others were rated as "passing".

[Resistance Against a Calcium Chloride]

The corrugate tube having the inner diameter of 25 mm and the length of 300 mm being bended into a U shape (R=50 mm) was used as a test piece, and the test piece was immersed in a 35 percent by mass of calcium chloride ($CaCl_2$) solution for 5 seconds. And then, the U-shaped test piece was left in a thermohygrostat bath of 30% RH for 300 hours at 80 degrees C. After the test piece was retrieved from the thermohygrostat bath, the bended part was bended and whether a cracking was caused or not was checked with eyes. The ones did not have a cracking were rated as "passing", the others were rated as failure.

[Heat Aging Resistance 2]

A test piece was prepared by covering a periphery of a bundle of 3 crosslinked olefin wires having a cross-section area of 20 $mm^2$ and a length of 35 cm with a braided shield (tin-plated copper wire) having a cross-section area of 14 $mm^2$, storing it into the corrugate tube formed to have the inner diameter of 25 mm, taping the corrugate tube with a polyvinyl chloride tape at three parts, or the center and both ends. The test of the heat aging resistance was conducted using this test piece, and the ones having the heat aging resistance of 500 hours or more at 150 degrees C. with no visible cracking and chipping caused by the test was rated as "passing".

[Abrasion Resistance]

A test piece was prepared by cutting the corrugate tube having the inner diameter of 25 mm with a metallic bar passed through into a length of 100 mm. The test piece was fixed to be contact with an abrasing tape made from a prescribed polishing cloth of #150 in roughness. The test piece was moved with a load of 450 gf at a tape speed of 1500 mm/min. And then, the length of the tape was measured until the metallic bar and the tape contacted. The length of more than 10000 mm was rated as "passing" and others were rated as failure.

[Impact Test]

A steel ball of 200 g was dropped freely from a height of 50 cm onto the corrugate tube having the inner diameter of 10 mm in which prescribed number of wires were stored. When there was no visible clacking; splitting, and deformation, it was rated as "passing", the others were rated as failure.

[Heat Deformation Resistance]

The changes in the dimension were measured after the corrugate tube having the inner diameter of 10 mm in which prescribed number of wires were stored was put in a thermostatic chamber in stationary state for 1 hour at 150 degrees C. When the rate of changes in the vertical direction and outermost diameter before and after putting in was less than 2%, it was rated as "passing", the others were rated as failure.

TABLE 1

| | | | | | Examples | | | | | | | | |
|---|---|---|---|---|---|---|---|---|---|---|---|---|---|
| | | | | | 1 | 2 | 3 | 4 | 5 | 6 | 7 | 8 | 9 |
| Constituents (A) polypropylene | | | | | | | | | | | | | |
| | MFR g/10 min | Melting Point °C. | Tensile Strength MPa | Charpy impact strength kJ/m² (23° C.) | | | | | | | | | |
| Block PP 1 | 0.5 | >160 | 28 | >20 | | | | | | | | | |
| Block PP 2 | 2.5 | >160 | 27 | 60 | 100 | 100 | 100 | 100 | 100 | 100 | 100 | 100 | 100 |
| Block PP 3 | 5 | >160 | 29 | 12 | | | | | | | | | |
| Block PP 4 | 9 | >160 | 29 | 12 | | | | | | | | | |
| Block PP 5 | 0.8 | <150 | 30 | 18 | | | | | | | | | |
| homo PP | 2 | >160 | 33 | 7 | | | | | | | | | |
| PP Elastomer | 1 | 150 | 26 | — (nondestruction) | | | | | | | | | |
| (B) bromine-based flame retardant | | | | | 2 | 2 | 2 | 2 | 2 | 2 | 2 | 2 | 2 |
| (C) antimony trioxide | | | | | 1 | 1 | 1 | 1 | 1 | 1 | 1 | 1 | 1 |
| (D) phenol-based antioxidant | | | | | 0.2 | 3 | 0.1 | 0.3 | 3 | 3 | 0.1 | 0.3 | 0.3 |
| (E) imidazole-based antioxidant | | | | | | | | | | | 0.1 | 1 | 3 |
| (F) metal deactivator | | | | | 0.2 | 3 | 0.1 | 0.3 | 3 | 3 | 0.1 | 0.3 | 0.3 |
| (G) phosphorus-based antioxidant | | | | | | | 0.1 | 0.2 | 0.2 | 3 | | | |
| (H) zinc oxide | | | | | | | | | | | 0.1 | 1 | 3 |
| (I) magnesium oxide | | | | | | | | | | | | | |
| Test Results | | | | | | | | | | | | | |
| flame retardancy (oxygen index) | | | | | passing | passing | passing | passing | passing | passing | passing | passing | passing |
| tensile strength | | | | | passing | passing | passing | passing | passing | passing | passing | passing | passing |
| breaking elongation | | | | | good | good | good | good | good | good | passing | good | good |
| heat aging resistance 1 | | | | | passing | good | passing | good | good | good | good | good | good |
| bleed | | | | | passing | passing | passing | passing | passing | passing | passing | passing | passing |
| formability | | | | | passing | passing | passing | passing | passing | passing | passing | passing | passing |
| resistance against a calcium chloride | | | | | passing | passing | passing | passing | passing | passing | passing | passing | passing |
| heat aging resistance 2 | | | | | passing | passing | passing | passing | passing | passing | passing | passing | passing |
| abrasion resistance | | | | | passing | passing | passing | passing | passing | passing | passing | passing | passing |
| impact test | | | | | passing | passing | passing | passing | passing | passing | passing | passing | passing |
| heat deformation resistance | | | | | passing | passing | passing | passing | passing | passing | passing | passing | passing |

TABLE 2

| | | | | | Examples | | | | | | | |
|---|---|---|---|---|---|---|---|---|---|---|---|---|
| | | | | | 10 | 11 | 12 | 13 | 14 | 15 | 16 | 17 |
| Constituents (A) polypropylene | | | | | | | | | | | | |
| | MFR g/10 min | Melting Point °C. | Tensile Strength MPa | Charpy impact strength kJ/m² (23° C.) | | | | | | | | |
| Block PP 1 | 0.5 | >160 | 28 | >20 | | | | | | | 100 | |
| Block PP 2 | 2.5 | >160 | 27 | 60 | 100 | 100 | 100 | 100 | 100 | 100 | | 100 |
| Block PP 3 | 5 | >160 | 29 | 12 | | | | | | | | |
| Block PP 4 | 9 | >160 | 29 | 12 | | | | | | | | |
| Block PP 5 | 0.8 | <150 | 30 | 18 | | | | | | | | |
| homo PP | 2 | >160 | 33 | 7 | | | | | | | | |
| PP Elastomer | 1 | 150 | 26 | — (nondestruction) | | | | | | | | |
| (B) bromine-based flame retardant | | | | | 2 | 2 | 2 | 1 | 5 | 10 | 2 | 2 |
| (C) antimony trioxide | | | | | 1 | 1 | 1 | 0.5 | 2.5 | 5 | 1 | 1 |

TABLE 2-continued

| | Examples | | | | | | | |
|---|---|---|---|---|---|---|---|---|
| | 10 | 11 | 12 | 13 | 14 | 15 | 16 | 17 |
| (D) phenol-based antioxidant | 0.1 | 0.3 | 3 | 0.3 | 0.3 | 0.3 | 0.3 | 0.3 |
| (E) imidazole-based antioxidant | 0.1 | 0.5 | 3 | | | | | |
| (F) metal deactivator | 0.1 | 0.3 | 3 | 0.3 | 0.3 | 0.3 | 0.3 | 0.3 |
| (G) phosphorus-based antioxidant | 0.1 | 0.2 | 3 | 0.2 | 0.2 | 0.2 | 0.2 | 0.2 |
| (H) zinc oxide | 0.1 | 0.5 | 3 | | | | | |
| (I) magnesium oxide | | | | | | | | |
| Test Results | | | | | | | | |
| flame retardancy (oxygen index) | passing | passing | passing | passing | passing | passing | passing | passing |
| tensile strength | passing | passing | passing | passing | passing | passing | passing | passing |
| breaking elongation | good | good | good | good | good | good | good | good |
| heat aging resistance 1 | good | excllent | excellent | good | good | good | pood | good |
| bleed | passing | passing | passing | passing | passing | passing | passing | passing |
| formability | passing | passing | passing | passing | passing | passing | passing | passing |
| resistance against a calcium chloride | passing | passing | passing | passing | passing | passing | passing | passing |
| heat aging resistance 2 | passing | passing | passing | passing | passing | passing | passing | passing |
| abrasion resistance | passing | passing | passing | passing | passing | passing | passing | passing |
| impact test | passing | passing | passing | passing | passing | passing | passing | passing |
| heat deformation resistance | passing | passing | passing | passing | passing | passing | passing | passing |

TABLE 3

| | | | | | Comparative Examples | | | | | | | | |
|---|---|---|---|---|---|---|---|---|---|---|---|---|---|
| | | | | | 1 | 2 | 3 | 4 | 5 | 6 | 7 | 8 | 9 |
| Constituents | | | | | | | | | | | | | |
| (A) polypropylene | | | | | | | | | | | | | |
| | MFR g/10 min | Melting Point °C. | Tensile Strength MPa | Charpy impact strength kJ/m$^2$ (23° C.) | | | | | | | | | |
| Block PP 1 | 0.5 | >160 | 28 | >20 | | | | | | | | | |
| Block PP 2 | 2.5 | >160 | 27 | 60 | 100 | 100 | 100 | 100 | 100 | 100 | 100 | 100 | 100 |
| Block PP 3 | 5 | >160 | 29 | 12 | | | | | | | | | |
| Block PP 4 | 9 | >160 | 29 | 12 | | | | | | | | | |
| Block PP 5 | 0.8 | <150 | 30 | 18 | | | | | | | | | |
| homo PP | 2 | >160 | 33 | 7 | | | | | | | | | |
| PP Elastomer | 1 | 150 | 26 | — (nondestruction) | | | | | | | | | |
| PA 6 | 5 | 215 | 80 | 5 | | | | | | | | | |
| (B) bromine-based flame retardant | | | | | | 2 | 2 | 2 | 2 | 2 | 2 | 2 | 2 |
| (C) antimony trioxide | | | | | | 1 | 1 | 1 | 1 | 1 | 1 | 1 | 1 |
| (D) phenol-based antioxidant | | | | | 0.3 | 3 | 5 | 0.1 | 0.05 | 3 | 0.1 | 0.1 | 0.3 |
| (E) imidazole-based antioxidant | | | | | | | | | | | 0.1 | | 5 |
| (F) metal deactivator | | | | | 0.3 | | | 0.1 | 0.05 | | 5 | 0.1 | 0.3 |
| (G) phosphorus-based antioxidant | | | | | 0.1 | | | | 0.05 | 5 | | | |
| (H) zinc oxide | | | | | | | | | | | | 0.1 | 5 |
| (I) magnesium oxide | | | | | 80 | | | | | | | | |
| (J) melamine cyanurate | | | | | | | | | | | | | |
| (K) copper iodide | | | | | | | | | | | | | |
| (L) potassium iodide | | | | | | | | | | | | | |
| Test Results | | | | | | | | | | | | | |
| flame retardancy (oxygen index) | | | | | failure | passing | biaxial kneading unavailable | passing | passing | biaxial kneading unavailable | passing | passing | passing |
| tensile strength | | | | | passing | passing | | passing | passing | | passing | passing | passing |
| breaking elongation | | | | | failure | good | | good | good | | good | good | passing |
| heat aging resistance 1 | | | | | failure | failure | | failure | failure | | failure | failure | good |
| bleed | | | | | passing | failure | | passing | passing | | passing | passing | failure |
| form ability | | | | | — | — | — | — | — | — | — | — | — |
| resistance against a calcium chloride | | | | | — | — | — | — | — | — | — | — | — |
| heat aging resistance 2 | | | | | — | — | — | — | — | — | — | — | — |
| abrasion resistance | | | | | — | — | — | — | — | — | — | — | — |
| impact test | | | | | — | — | — | — | — | — | — | — | — |
| heat deformation resistance | | | | | — | — | — | — | — | — | — | — | — |

TABLE 4

| | | | | | Comparative Examples | | | | | | | |
|---|---|---|---|---|---|---|---|---|---|---|---|---|
| | | | | | 10 | 11 | 12 | 13 | 14 | 15 | 16 | 17 |
| Constituents | | | | | | | | | | | | |
| (A) polypropylene | | | | | | | | | | | | |
| | MFR g/10 min | Melting Point °C. | Tensile Strength MPa | Charpy impact strength kJ/m$^2$ (23° C.) | | | | | | | | |
| Block PP 1 | 0.5 | >160 | 28 | >20 | | | | | | | | |
| Block PP 2 | 2.5 | >160 | 27 | 60 | 100 | 100 | 100 | | | | | |
| Block PP 3 | 5 | >160 | 29 | 12 | | | | | | | | |
| Block PP 4 | 9 | >160 | 29 | 12 | | | | 100 | | | | |
| Block PP 5 | 0.8 | <150 | 30 | 18 | | | | | 100 | | | |
| homo PP | 2 | >160 | 33 | 7 | | | | | | 100 | | |
| PP Elastomer | 1 | 150 | 26 | — (nondestruction) | | | | | | | 100 | |
| PA 6 | 5 | 215 | 80 | 5 | | | | | | | | 100 |
| (B) bromine-based flame retardant | | | | | 2 | 0.5 | 20 | 2 | 2 | 2 | 2 | |
| (C) antimony trioxide | | | | | 1 | 0.25 | 10 | 1 | 1 | 1 | 1 | |
| (D) phenol-based antioxidant | | | | | 0.3 | 0.3 | 0.3 | 0.3 | 0.3 | 0.3 | 0.3 | |
| (E) imidazole-based antioxidant | | | | | 5 | | | | | | | |
| (F) metal deactivator | | | | | 0.3 | 0.3 | 0.3 | 0.3 | 0.3 | 0.3 | 0.3 | |
| (G) phosphorus-based antioxidant | | | | | 0.2 | 0.2 | 0.2 | 0.2 | 0.2 | 0.2 | 0.2 | |
| (H) zinc oxide | | | | | 5 | | | | | | | |
| (I) magnesium oxide | | | | | | | | | | | | |
| (J) melamine cyanurate | | | | | | | | | | | | 1 |
| (K) copper iodide | | | | | | | | | | | | 0.1 |
| (L) potassium iodide | | | | | | | | | | | | 0.1 |
| Test Results | | | | | | | | | | | | |
| flame retardancy (oxygen index) | | | | | passing | failure | passing | passing | passing | passing | passing | passing |
| tensile strength | | | | | passing | passing | passing | passing | passing | passing | passing | passing |
| breaking elongation | | | | | passing | good | passing | good | good | failure | good | failure |
| heat aging resistance 1 | | | | | excellent | good | failure | good | failure | passing | good | good |
| bleed | | | | | failure | passing | passing | passing | passing | passing | passing | passing |
| form ability | | | | | — | — | — | forming unavailable | — | passing | passing | passing |
| resistance against a calcium chloride | | | | | — | — | — | — | — | passing | passing | failure |
| heat aging resistance 2 | | | | | — | — | — | — | — | passing | passing | passing |
| abrasion resistance | | | | | — | — | — | — | — | passing | failure | passing |
| impact test | | | | | — | — | — | — | — | failure | passing | passing |
| heat deformation resistance | | | | | — | — | — | — | — | passing | passing | passing |

As shown in Table 1 and 2, Examples 1 to 17 were rated as more than passing or good in each evaluation. In contrast, as shown in Table 3 and 4, Comparative Examples 1 to 17 did not satisfy all of the evaluations.

The foregoing description of the preferred embodiments of the present invention has been presented for purposes of illustration and description; however, it is not intended to be exhaustive or to limit the present invention to the precise form disclosed, and modifications and variations are possible as long as they do not deviate from the principles of the present invention.

The invention claimed is:

1. A composition for a wire protective member comprising:
   a polypropylene having a propylene monomer constituting 50 to 95 percent by mass of monomers forming a polymer, a melt flow rate of 0.5 to 5 g/10 min, and a melting point of 150 degrees C. or more;
   a bromine-based flame retardant and an antimony trioxide as a flame retarder;
   a phenol-based antioxidant as a heat resistance life improving agent; and
   a metal deactivator,
   wherein the propylene has a tensile strength of 20 to 35 MPa and a Charpy impact strength of 10 kJ/m$^2$ or more at 23 degrees C.; and
   1.5 to 15 parts by mass in total of the bromine-based flame retardant and the antimony trioxide, 0.1 to 3 parts by mass of the phenol-based antioxidant, and 0.1 to 3 parts by mass of the metal deactivator are compounded with 100 parts by mass of the polypropylene.

2. A composition for a wire protective member according to claim 1, wherein 0.1 to 3 parts by mass of an imidazole-based antioxidant is further compounded with 100 parts by mass of the polypropylene.

3. A composition for a wire protective member according to claim 2, wherein 0.1 to 3 parts by mass of a phosphorus-based antioxidant is further compounded with 100 parts by mass of the polypropylene.

4. A composition for a wire protective member according to claim 3, wherein 0.1 to 3 parts by mass of a phosphorus-based antioxidant is further compounded with 100 parts by mass of the polypropylene.

5. A wire protective member made of the composition for a wire protective member according to claim 4 formed in a shape being able to protect a wire.

6. A wire harness, wherein a bundle of insulated wires is coated with a wire protective member made of the composition for a wire protective member according to claim 4.

7. A composition for a wire protective member according to claim 4, wherein the metallic oxide is at least one kind selected from the group consisting of a zinc oxide, an aluminum oxide, a magnesium oxide, and a tin oxide.

8. A wire protective member made of the composition for a wire protective member according to claim 7 formed in a shape being able to protect a wire.

9. A wire harness, wherein a bundle of insulated wires is coated with a wire protective member made of the composition for a wire protective member according to claim 7.

10. A wire protective member made of the composition for a wire protective member according to claim 3 formed in a shape being able to protect a wire.

11. A wire harness, wherein a bundle of insulated wires is coated with a wire protective member made of the composition for a wire protective member according to claim 3.

12. A wire protective member made of the composition for a wire protective member according to claim 2 formed in a shape being able to protect a wire.

13. A wire harness, wherein a bundle of insulated wires is coated with a wire protective member made of the composition for a wire protective member according to claim 2.

14. A composition for a wire protective member according to claim 1, wherein 0.1 to 3 parts by mass of a phosphorus-based antioxidant is further compounded with 100 parts by mass of the polypropylene.

15. A composition for a wire protective member according to claim 1 wherein 0.1 to 3 parts by mass of a metallic oxide is further compounded with 100 parts by mass of the polypropylene.

16. A composition for a wire protective member according to claim 15, wherein the metallic oxide is at least one kind selected from the group consisting of a zinc oxide, an aluminum oxide, a magnesium oxide, and a tin oxide.

17. A wire harness, wherein a bundle of insulated wires is coated with a wire protective member made of the composition for a wire protective member according to claim 16.

18. A wire protective member made of the composition for a wire protective member according to claim 16 formed in a shape being able to protect a wire.

19. A wire protective member made of the composition for a wire protective member according to claim 1, formed in a shape being able to protect a wire.

20. A wire harness, wherein a bundle of insulated wires is coated with a wire protective member made of the composition for a wire protective member according to claim 1.

* * * * *